(12) United States Patent
Xue et al.

(10) Patent No.: US 10,196,087 B2
(45) Date of Patent: Feb. 5, 2019

(54) METHOD FOR DRILLING A STEERING KNUCKLE CASTING

(71) Applicant: CITIC Dicastal CO., LTD, Qinhuangdao (CN)

(72) Inventors: Bowen Xue, Qinhuangdao (CN);
Yacong Zhang, Qinhuangdao (CN);
Jiandong Guo, Qinhuangdao (CN);
Yongning Wang, Qinhuangdao (CN);
Zhihua Zhu, Qinhuangdao (CN);
Changhai Li, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 437 days.

(21) Appl. No.: 14/990,217

(22) Filed: Jan. 7, 2016

(65) Prior Publication Data
US 2016/0200356 A1    Jul. 14, 2016

(30) Foreign Application Priority Data
Jan. 9, 2015    (CN) .......................... 2015 1 0011205

(51) Int. Cl.
*B62D 7/18*    (2006.01)
*B23B 35/00*    (2006.01)
*B23B 41/00*    (2006.01)

(52) U.S. Cl.
CPC ............... *B62D 7/18* (2013.01); *B23B 35/00* (2013.01); *B23B 41/00* (2013.01)

(58) Field of Classification Search
CPC .......... B62D 7/18; B23B 41/00; B23B 35/00; B23Q 3/06
See application file for complete search history.

(56) References Cited

U.S. PATENT DOCUMENTS 9,669,501 B1 *    6/2017    Dolan ..................... B23P 19/04

* cited by examiner

*Primary Examiner* — Moshe Wilensky
(74) *Attorney, Agent, or Firm* — Maier & Maier, PLLC

(57) ABSTRACT

The present invention relates to a method for drilling in steering knuckles, which comprises locating a casted steering knuckle onto a drilling fixture for a steering knuckle, and aligning the center lines of the maching points of the left and right pieces of the steering knuckle. The method provided by the present invention can meet the requirement for simultaneously drilling the left and right symmetrical pieces of the steering knuckle when in use, and in the meantime, has outstanding advantages of advance technology, high positioning precision, firmness in positioning, high machining efficiency and the like.

11 Claims, 4 Drawing Sheets

METHOD FOR DRILLING A STEERING KNUCKLE CASTING

TECHNICAL FIELD

The present invention relates to a fixture, and in particular to a fixture for a method for drilling a steering knuckle casting.

BACKGROUND ART

A steering knuckle, as one of the main parts of an automobile steering axle, is capable of allowing a car to run stably and transferring running direction sensitively, and plays roles of bearing front loads of the car and supporting as well as driving front wheels to rotate around master pins to consequently make the car steer. Under a car running state, the steering knuckle bears variable impact loads, thus is required to possess very high strength, and is also highly required in dimensional parameters.

Due to peculiar space structure characteristic and special functions, the workpiece of automobile steering knuckle tends to be used in pair of a left piece and a right piece. Generally, the left piece and the right piece of the steering knuckle are workpieces that are in mirror symmetry but cannot rotate to coincide. Since the left piece and the right piece are different in structure, two sets of fixtures are generally needed during machining to perform machining on the left and right pieces respectively, which not only increases the machining cost but also greatly affects the machining efficiency.

In the meantime, since the left and right pieces are machined separately, both are slightly different in structure parameters inevitably. In the actual application of the workpiece of steering knuckle, this will result in that the workpiece decreases in operating precision, reduced in service life and influenced in performance.

At present, there is no technology and device for commonly machining the left and right pieces of the workpiece of steering knuckle in the technical field.

SUMMARY OF THE INVENTION

An object of the present invention is to provide a fixture, which can meet the requirement for drilling left and right symmetrical pieces of a steering knuckle simultaneously.

In order to achieve the above object, the present invention provides a drilling fixture for a steering knuckle.

In one aspect of the present invention, a drilling fixture for a steering knuckle is provided, which is characterized in that the fixture is composed of a first steering knuckle fixture, a second steering knuckle fixture and an insert plate supporting device; the first steering knuckle fixture and the second steering knuckle fixture are configured to make center lines of machining drilling points of a left knuckle and a right knuckle of the steering knuckle in coaxial arrangement; and the insert plate supporting device comprises fixable insert plates, which support the machining drilling points of the left and right knuckles of the steering knuckles.

In one preferable aspect of the present invention, the first steering knuckle fixture and the second steering knuckle fixture comprise pressing plates and floating pins, both of which are mounted on inclined plates.

In one preferable aspect of the present invention, the insert plate supporting device comprises a drilling sleeve plate and two fixable insert plates fixed through locking spanners.

In one preferable aspect of the present invention, an included angle between the inclined plate of each of the first steering knuckle fixture and the second steering knuckle fixture and a baseplate of the fixture is 30 to 75 degrees; and preferably, the included angle is 60 degrees.

In one preferable aspect of the present invention, an included angle between a crossed line between the inclined plate of the first steering knuckle fixture and a plane in which the baseplate is located and a crossed line between the inclined plate of the second steering knuckle fixture and the plane in which the baseplate is located is adjustable. Preferably, the included angle is 60 to 120 degrees; and further preferably, the included angle is 90 degrees.

In one preferable aspect of the present invention, the first steering knuckle fixture is composed of a baseplate (1), ribbed plates I (2), an inclined plate I (3), a mandrel I (4), a big pressing plate (5), a small pressing plate (6), a compression screw (7) and a floating pin I (8); the inclined plate I (3) is fixed on the baseplate (1), and the two ribbed plates I (2) are fixed between the inclined plate I (3) and the baseplate (1); the mandrel I (4) and the floating pin I (8) are mounted above the inclined plate I (3), and the mandrel I (4) is matched with a center hole and a flange face of a left piece of the steering knuckle to realize radial positioning for the left piece; the floating pin I (8) corresponds to a positioning hole in the left piece to realize circumferential positioning for the left piece; and the big pressing plate (5) and the small pressing plate (6) fix the left piece on the inclined plate I (3) through the compression screw (7).

In one preferable aspect of the present invention, the second steering knuckle fixture is composed of a big pressing plate (5), a small pressing plate (6), a compression screw (7), ribbed plates II (16), a standing plate (17), an inclined plate II (18), a mandrel II (19), and a floating pin II (20); the inclined plate II (18) is fixed on the baseplate (1) through the standing plate (17), the two ribbed plates II (16) are fixed between the inclined plate II (18) and the baseplate (1); both the mandrel II (19) and the floating pin II (20) are mounted on the inclined plate II (18), and the mandrel II (19) is matched with a center hole and a flange face of a right piece of the steering knuckle to realize radial positioning for the right piece; the floating pin II (20) corresponds to a positioning hole in the right piece to realize circumferential positioning for the left piece; and the big pressing plate (5) and the small pressing plate (6) fix the right piece on the inclined plate II (18) through the compression screw (7).

In one preferable aspect of the present invention, the insert plate supporting device is composed of an insert plate I (9), an insert plate II (10), a drilling sleeve plate (11), a supporting column (12), a locking spanner I (13), a locking spanner II (14) and springs (15); the supporting column (12) on which the drilling sleeve plate (11) is mounted is fixed on the baseplate (1), the insert plate I (9) and the insert plate II (10), with conicity at front ends, are matched with four square holes in the supporting column (12) through two square column at rear ends respectively, the four springs (15) are mounted on the square columns at the back of the insert plate I (9) and the insert plate II (10) to realize the contraction thereof at a natural state; and the locking spanner I (13) and the locking spanner II (14) are in threaded connection with the supporting column (12) to realize the support of the insert plate I (9) and the insert plate II (10) to two workpiece holes.

In one preferable aspect of the present invention, the diameter of a middle hole in the big pressing plate (5) is more than that of the head of the compression screw (7).

In one preferable aspect of the present invention, the small pressing plate (6) is of an open type.

In another aspect of the present invention, a method for drilling a steering knuckle casting is also provided, which comprises the steps of mounting the steering knuckle casting on the drilling fixture for the steering knuckle as described in the present invention, and coaxially arranging the center lines of the machining drilling points of the left and right knuckles of the steering knuckle.

In one preferable aspect of the present invention, the method comprises the following steps of (1) fixing the left piece of the steering knuckle on the inclined plate I through the mandrel I, the floating pin I, the big pressing plate, the small pressing plate, the compression screw and the like; (2) fixing the right piece of the steering knuckle on the inclined plate II through the mandrel II, the floating pin II, the big pressing plate, the small pressing plate and the compression screw; (3) adjusting to allow the center lines of four machining holes in the well fixed left and right pieces of the steering knuckle to be coaxial; and (4) supporting the two symmetrical pieces of the steering knuckle by the insert plate I and the insert plat II via the locking spanner I and the locking spanner II.

In another aspect of the present invention, a drilling fixture for a steering knuckle is also provided, which is composed of a baseplate, ribbed plates I, an inclined plate I, a mandrel I, big pressing plates, small pressing plates, compression screws, a floating pin I, an insert plate I, an insert plate II, a drilling sleeve plate, a supporting column, a locking spanner I, a locking spanner II, springs, ribbed plates II, a standing plate, an inclined plate II, a mandrel II and a floating pin II, wherein the inclined plate I is fixed on the baseplate, and the two ribbed plates I are fixed between the inclined plate I and the baseplate; both the mandrel I and the floating pin I are mounted above the inclined plate I, and the mandrel I is matched with a center hole and a flange face of a left piece of the steering knuckle to realize radial positioning for the left piece; the floating pin I corresponds to a positioning hole in a left piece to realize circumferential positioning for the left piece; and the big pressing plate and the small pressing plate fix the left piece on the inclined plate I through the compression screw. The inclined plate II is fixed on the baseplate through the standing plate, and the two ribbed plates II are fixed between the inclined plate II and the baseplate; both the mandrel II and the floating pin II are mounted on the inclined plate II, and the mandrel II is matched with a center hole and a flange face of the right piece of the steering knuckle to realize radial positioning for the right piece; the floating pin II corresponds to a positioning hole in the right piece to realize circumferential positioning for the left piece; the big pressing plate and small pressing plate fix the right piece on the inclined plate II through the compression screw; and the center lines of the four machining holes of the well fixed left and right pieces of the steering knuckle are coaxial. The supporting column on which the drilling sleeve plate is mounted is fixed on the baseplate, the insert plates I and II with conicity at front ends are matched with four square holes in the supporting column through two square column at rear ends respectively, the four springs are mounted on the square column at the back of the insert plates I and II to realize the contraction thereof at a natural state; and the locking spanner I and the locking spanner II are in threaded connection with the supporting column to realize the support of the insert plate I and the insert plate II to two workpiece holes.

In actual usage, the left piece of the steering knuckle is fixed on the inclined plate I through the mandrel I, the floating pin I, the big pressing plate, the small pressing plate, the compression screw and the like; the right piece of the steering knuckle is fixed on the inclined plate II through the mandrel II, the floating pin II, the big pressing plate, the small pressing plate, the compression screw and the like; the center lines of the four machining holes in the well fixed left and right pieces of the steering knuckle are coaxial; and then, the insert plate I and the insert plate II play a role of supporting the two symmetrical pieces of the steering knuckle through the locking spanner I and the locking spanner II to prevent tool vibration during machining.

In other aspects of the present invention, a drilling fixture for a steering knuckle is also provided, which is composed of a baseplate (1), ribbed plates I (2), an inclined plate I (3), a mandrel I (4), big pressing plates (5), small pressing plates (6), compression screws (7), a floating pin I (8), an insert plate I (9), an insert plate II (10), a drilling sleeve plate (11), a supporting column (12), a locking spanner I (13), a locking spanner II (14), springs (15), ribbed plates II (16), a standing plate (17), an inclined plate II (18), a mandrel II (19) and a floating pin II (20), and is characterized in that the inclined plate I (3) is fixed on the baseplate (1), and the two ribbed plates I (2) are fixed between the inclined plate I (3) and the baseplate (1); both the mandrel I (4) and the floating pin I (8) are mounted above the inclined plate I (3), and the mandrel I (4) is matched with a center hole and a flange face of a left piece of the steering knuckle to realize radial positioning for the left piece; the floating pin I (8) corresponds to a positioning hole in the left piece to realize circumferential positioning for the left piece; and the big pressing plate (5) and small pressing plate (6) fix the left piece on the inclined plate I (3) through the compression screw (7). The inclined plate II (18) is fixed on the baseplate (1) through the standing plate (17), and the two ribbed plates II (16) are fixed between the inclined plate II (18) and the baseplate (1); both the mandrel II (19) and the floating pin II (20) are mounted on the inclined plate II (18), and the mandrel II (19) is matched with a center hole and a flange face of a right piece of the steering knuckle to realize radial positioning for the right piece; the floating pin II (20) corresponds to a positioning hole in the right piece to realize circumferential positioning for the left piece; the big pressing plate (5) and the small pressing plate (6) fix the right piece on the inclined plate II (18) through the compression screw (7); and the center lines of four machining holes of well fixed left and right pieces of the steering knuckle are coaxial. The supporting column (12) on which the drilling sleeve plate (11) is mounted is fixed on the baseplate (1), the insert plate I (9) and the insert plate II (10), with conicity at front ends, are matched with four square holes in the supporting column (12) through two square column at rear ends respectively, the four springs (15) are mounted on the square column at the back of the insert plate I (9) and the insert plate II (10) to realize the contraction thereof at a natural state; and the locking spanner I (13) and the locking spanner II (14) are in threaded connection with the supporting column (12) to realize the support of the insert plate I (9) and the insert plate II (10) to two workpiece holes.

A drilling fixture for a steering knuckle according to the foregoing description is also provided, which is characterized in that the diameter of a middle hole of the big pressing plate (5) is slightly more than that of a head of the compression screw (7), and the big pressing plate (5) may be installed in from the upside of the compression screw (7) directly; the small pressing plate (6) is of an open type; and the big pressing plate (5) and the small pressing plate (6) are used in combination to clamp a workpiece rapidly and conveniently.

The drilling fixture provided by the present invention can meet the requirement for simultaneously drilling the left and right symmetrical pieces of the steering knuckle when in use, and in the meantime, has outstanding advantages of advance technology, high positioning precision, firmness in positioning, high machining efficiency and the like.

Figure 1:
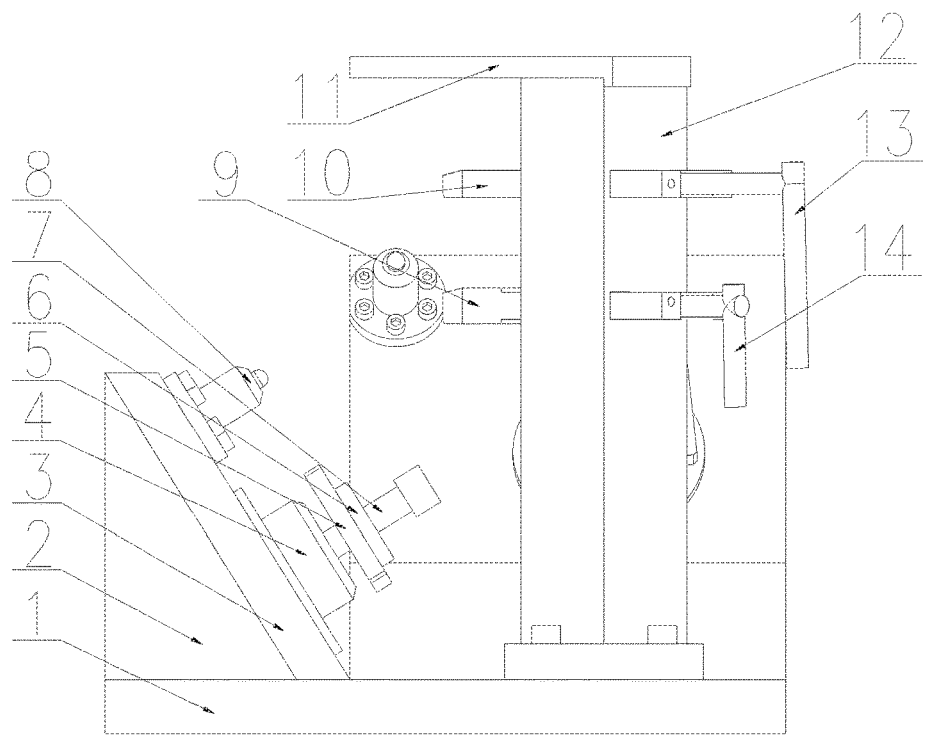
FIG. 1 is a front view of a drilling fixture for a steering knuckle.
Figure 2:
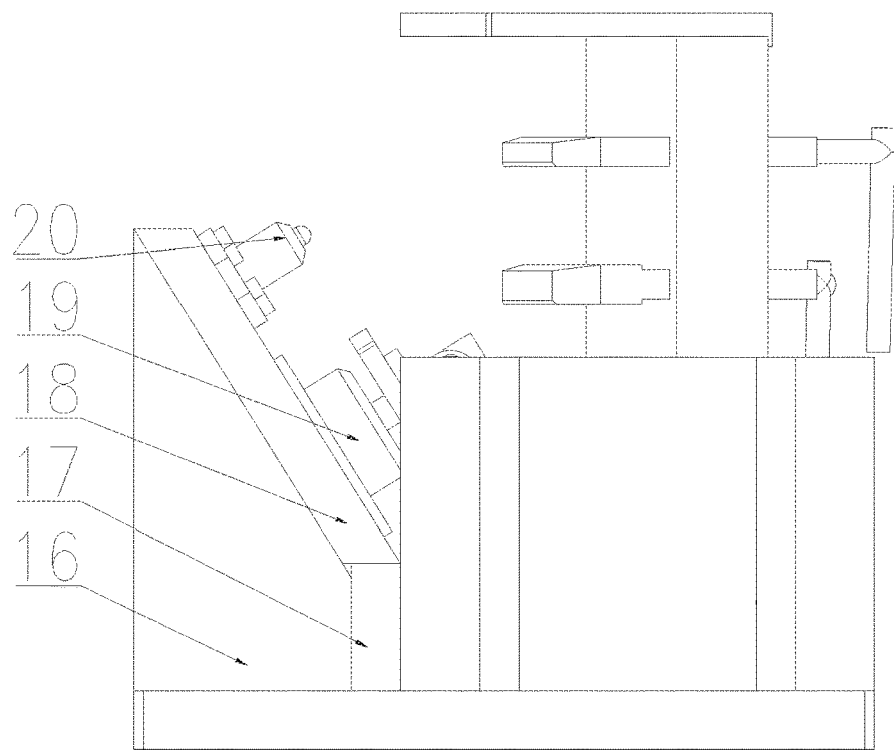
FIG. 2 is a left view of a drilling fixture for a steering knuckle.
Figure 3:
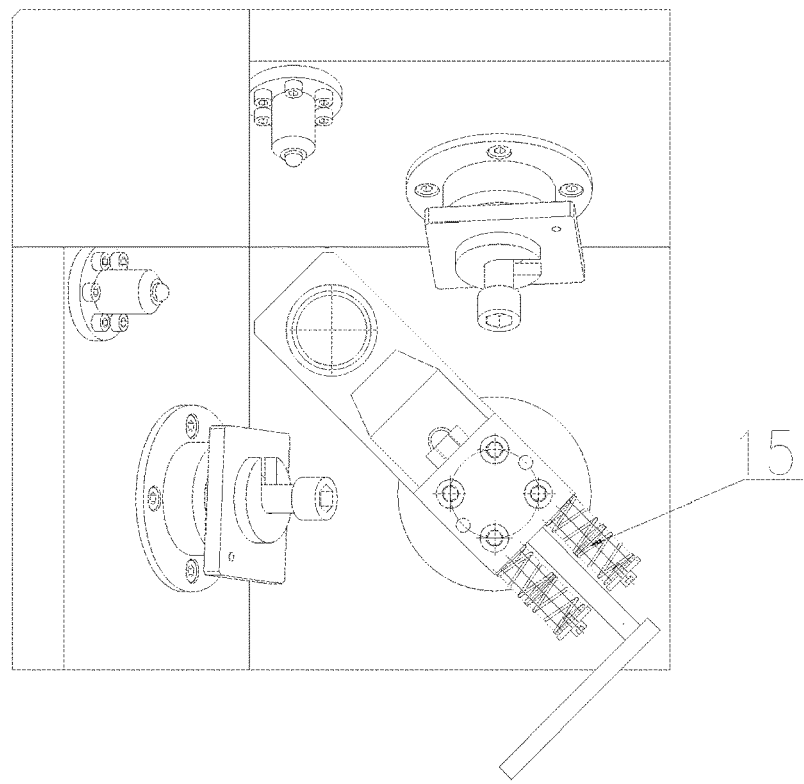
FIG. 3 is a top view of a drilling fixture for a steering knuckle.
Figure 4:
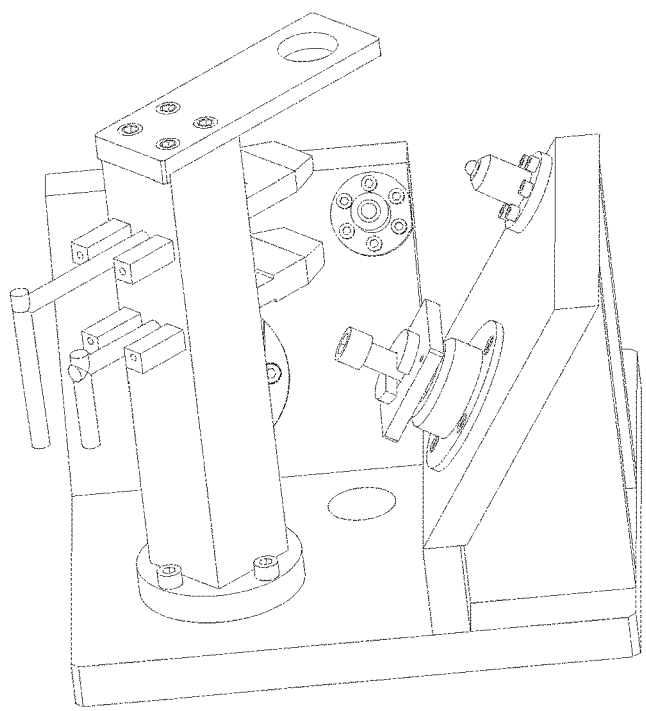
FIG. 4 is an isometric view of a drilling fixture for a steering knuckle.
Figure 5:
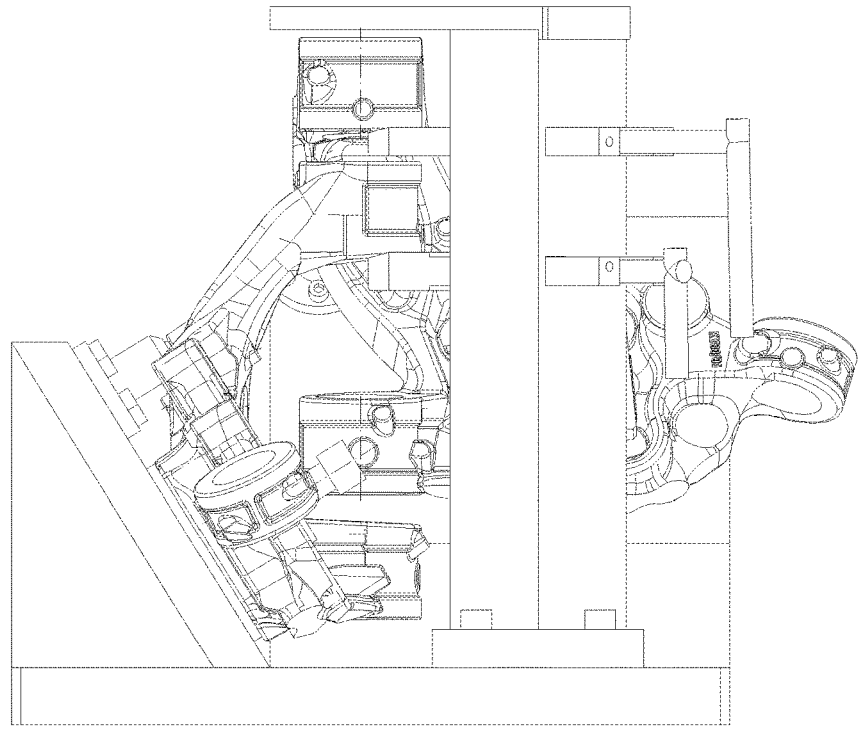
FIG. 5 is a front view of a drilling fixture for a steering knuckle during clamping of two workpieces.
Figure 6:
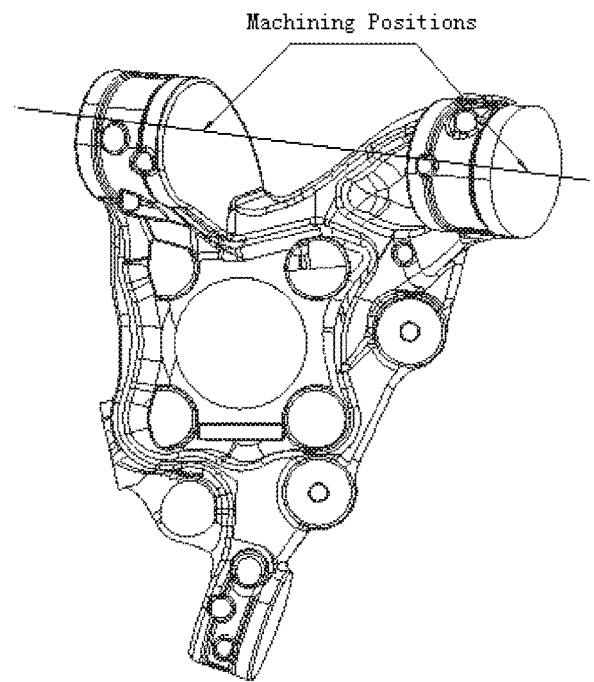
FIG. 6 is a front view of a right piece of a steering knuckle.
Figure 7:
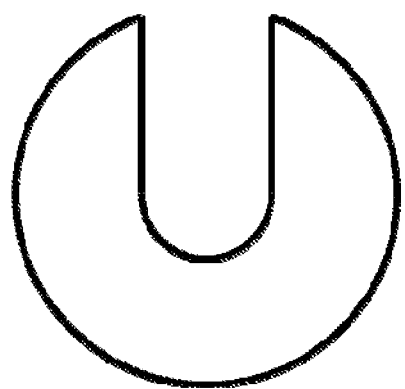
FIG. 7 is a front view of a small pressing plate.

In the figures, the numeric symbols are as follows: 1—baseplate, 2—ribbed plate I, 3—inclined plate I, 4—mandrel I, 5—big pressing plate, 6—small pressing plate, 7—compression screw, 8—floating pin I, 9—insert plate I, 10—insert plate II, 11—drilling sleeve plate, 12—supporting column, 13—locking spanner I, 14—locking spanner II, 15—spring, 16—ribbed plate II, 17—standing plate, 18—inclined plate II, 19—mandrel II, and 20—floating pin II.

DETAILED DESCRIPTION OF THE INVENTION

In the following, the details and working conditions of a specific device provided based on the present invention are described in combination with figures.

The fixture is composed of a baseplate 1, ribbed plates I 2, an inclined plate I 3, a mandrel I 4, big pressing plates 5, small pressing plates 6, compression screws 7, a floating pin I 8, an insert plate I 9, an insert plate II 10, a drilling sleeve plate 11, a supporting column 12, a locking spanner I 13, a locking spanner II 14, springs 15, ribbed plates II 16, a standing plate 17, an inclined plate II 18, a mandrel II 19 and a floating pin II 20, wherein the inclined plate I 3 is fixed on the baseplate 1, and two ribbed plates I 2 are fixed between the inclined plate I 3 and the baseplate 1; and both the mandrel I 4 and the floating pin I 8 are mounted above the inclined plate I 3, and the mandrel I 4 is matched with a center hole and a flange face of a left piece of the steering knuckle to realize radial positioning for the left piece; the floating pin I 8 corresponds to a positioning hole in the left piece to realize circumferential positioning for the left piece; and the big pressing plate 5 and small pressing plate 6 fix the left piece on the inclined plate I 3 through the compression screw 7.

The inclined plate II 18 is fixed on the baseplate 1 through the standing plate 17, and the two ribbed plates II 16 are fixed between the inclined plate II 18 and the baseplate 1; both the mandrel II 19 and the floating pin II 20 are mounted on the inclined plate II 18, and the mandrel II 19 is matched with a center hole and a flange face of a right piece of the steering knuckle to realize radial positioning for the right piece; the floating pin II 20 corresponds to a positioning hole in the right piece to realize circumferential positioning for the left piece; the big pressing plate 5 and the small pressing plate 6 fix the right piece on the inclined plate II 18 through the compression screw 7; and the center lines of four machining holes of well fixed left and right pieces of the steering knuckle are coaxial.

The supporting column 12 on which the drilling sleeve plate 11 is mounted is fixed on the baseplate 1, the insert plates I and II 9 and 10 with conicity at front ends are matched with four square holes in the supporting column 12 through two square column at rear ends respectively, the four springs 15 are mounted on the square column at the back of the insert plate I 9 and the insert plate II 10 to realize the contraction thereof at a natural state; and the locking spanner I 13 and the locking spanner II 14 are in threaded connection with the supporting column 12 to realize the support of the insert plate I 9 and the insert plate II 10 to two workpiece holes.

In a working process, the left piece of the steering knuckle is fixed on the inclined plate I 3 through the mandrel I 4, the floating pin I 8, the big pressing plate 5, the small pressing plate 6, the compression screw 7 and the like; the right piece of the steering knuckle is fixed on the inclined plate II 18 through the mandrel II 19, the floating pin II 20, the big pressing plate 5, the small pressing plate 6, the compression screw 7 and the like; the center lines of four machining holes in the well fixed left and right pieces of the steering knuckle are coaxial; and the insert plate I 9 and the insert plate II 10 play a role of supporting the two symmetrical pieces of the steering knuckle through the locking spanner I 13 and the locking spanner II 14 to prevent tool vibration during machining.

In embodiments of the present invention, an included angle between the inclined plate of each of the first steering knuckle fixture and the second steering knuckle fixture and the baseplate of the fixture is selected to be 30 degrees, 60 degrees and 75 degrees. In embodiments of the present invention, an included angle between a crossed line between the inclined plate of the first steering knuckle fixture and a plane in which the baseplate is located and a crossed line between the inclined plate of the second steering knuckle fixture and the plane in which the baseplate is located is selected to be 60 degrees, 90 degrees and 120 degrees. In tests, technicians found that at the above selectable angles, the coaxial arrangement of the center lines of the machining drilling points of the left and right pieces of the steering knuckle can be realized and the fixation of the machining drilling points of the left and right pieces of the steering knuckles are realized, thereby realizing the synchronous machining of the left and right pieces of the steering knuckle and improving the symmetry precision and working efficiency of machining.

In one typical embodiment of the drilling fixture for the steering knuckle provided by the present invention, with the included angle between the inclined plate of each of the first steering knuckle fixture and the second steering knuckle fixture and the baseplate of the fixture being selected to be 60 degrees, and the included angle between the crossed line between the inclined plate of the first steering knuckle fixture and the plane in which the baseplate is located and the crossed line between the inclined plate of the second steering knuckle fixture and the plane in which the baseplate is located being selected to be 90 degrees, after the left and right symmetrical pieces of the steering knuckle are drilled simultaneously, the drilling efficiency for the left and right symmetrical pieces of the steering knuckle is improved to be 200% of the original drilling efficiency, and the drilling machining of the left and right symmetrical pieces is completed in one step. In the meantime, the machining precision of the left and right symmetrical pieces is greatly improved. Compared with the reject ratio obtained without using the drilling fixture for the steering knuckle provided by the present invention, the reject ratio resulted from the precision of the symmetrical machining of the left and right symmetrical pieces is reduced by 87%.

The invention claimed is:

1. A method for drilling a steering knuckle casting, comprising:
   a step of locating a casted steering knuckle onto a drilling fixture for a steering knuckle, and aligning the center lines of the machining points of the left and right pieces of the steering knuckle;
   wherein the fixture comprises a first steering knuckle fixture, a second steering knuckle fixture and an insert plate supporting device;
   wherein the first steering knuckle fixture and the second steering knuckle fixture are configured to make center lines of machining drilling points of a left knuckle and a right knuckle of the steering knuckle in coaxial arrangement;
   wherein the insert supporting device comprises fixable insert plates, which support the machining drilling points of the left knuckle and the right knuckle of the steering knuckle; and
   wherein an included angle between a crossed line between an inclined plate of the first steering knuckle fixture and a plane in which a baseplate is located and a crossed line between an inclined plate of the second steering knuckle fixture and the plane in which the baseplate is located is adjustable.

2. The method according to claim 1, wherein the first steering knuckle fixture and the second steering knuckle fixture comprise pressing plates and floating pins, both of which are arranged on inclined plates.

3. The method according to claim 1, wherein the insert plate supporting device comprises a drilling sleeve plate and two fixable inserts plates fixed through locking spanners.

4. The method according to claim 1, wherein an included angle between the inclined plate of each of the first steering knuckle fixture and the second steering knuckle fixture and a baseplate of the fixture is 30 to 75 degrees.

5. The method according to claim 1, wherein the included angle is 60 to 120 degrees.

6. The method according to claim 1, wherein the first steering knuckle fixture is comprised of a baseplate, ribbed plates of the first steering knuckle, an inclined plate of the first steering knuckle, a mandrel of the first steering knuckle, a big pressing plate, a small pressing plate, a compression screw and a floating pin of the first steering knuckle; the inclined plate of the first steering knuckle is fixed on the baseplate, and two ribbed plates of the first steering knuckle are fixed between the inclined plate of the first steering knuckle and the baseplate; the mandrel of the first steering knuckle and the floating pin of the first steering knuckle are mounted above the inclined plate of the first steering knuckle, and the mandrel of the first steering knuckle is matched with a center hole and a flange face of a left piece of the steering knuckle to realize radial positioning for the left piece; the floating pin of the first steering knuckle corresponds to a positioning hole in the left piece to realize circumferential positioning for the left piece; and the big pressing plate and the small pressing plate fix the left piece on the first inclined plate of the first steering knuckle through the compression screw.

7. The method according to claim 1, wherein the second steering knuckle fixture is comprised of a big pressing plate, a small pressing plate, a compression screws, ribbed plates of the second steering knuckle, a standing plate, an inclined plate of the second steering knuckle, a mandrel of the second steering knuckle, and a floating pin of the second steering knuckle; the inclined plate of the second steering knuckle is fixed on the baseplate through the standing plate, and two ribbed plates of the second steering knuckle are fixed between the inclined plate of the second steering knuckle and the baseplate; both the mandrel of the second steering knuckle and the floating pin of the second steering knuckle are mounted above the inclined plate of the second steering knuckle, and the mandrel of the second steering knuckle is matched with a center hole and a flange face of a right piece of the steering knuckle to realize radial positioning for a right piece of the steering knuckle; the floating pin of the second steering knuckle corresponds to a positioning hole in the right piece to realize circumferential positioning for the left piece; and the big pressing plate and the small pressing plate fix the right piece on the inclined plate of the second steering knuckle through the compression screw.

8. The method according to claim 1, wherein the insert plate supporting device is comprised of a first insert plate of the first steering knuckle, a second insert plate of the second steering knuckle, a drilling sleeve plate, a supporting column, a first locking spanner of the first steering knuckle, a second locking spanner of the second steering knuckle and springs; the supporting column on which the drilling sleeve plate is mounted is fixed on the baseplate, the first insert plate of the first steering knuckle and the second insert plate of the second steering knuckle, with conicity at front ends, are matched with four square holes in the supporting column through two square column at rear ends respectively, and the four springs are mounted on the square columns at the back of the first insert plates of the first steering knuckle and second insert plate of the second steering knuckle to realize the contraction thereof at a natural state; and the first locking spanner of the first steering knuckle and the second locking spanner of the second steering knuckle are in threaded connection with the supporting column to realize the support of the first insert plate of the first steering knuckle and the second insert plate of the second steering knuckle to two workpiece holes.

9. The method according to claim 6, wherein the diameter of a middle hole in the big pressing plate is greater than that of the head of the compression screw.

10. The method according to claim 6, wherein the small pressing plate is of an open type.

11. The method according to claim 5, wherein the method further comprises the following steps:
   fixing the left piece of the steering knuckle on the inclined plate of the first steering knuckle through the mandrel of the first steering knuckle, the floating pin of the first steering knuckle, the big pressing plate, the small pressing plate, and the compression screw;
   fixing the right piece of the steering knuckle on the inclined plate of the second steering knuckle through the mandrel of the second steering knuckle, the floating pin of the second steering knuckle, the big pressing plate, the small pressing plate and the compression screw; adjusting to allow the center lines of four machining holes in the fixed left and right pieces of the steering knuckle to be coaxial; and supporting the two symmetrical pieces of the steering knuckle by the insert plate of the first steering knuckle and the insert plate of the second steering knuckle via the locking spanner of the first steering knuckle and the locking spanner of the second steering knuckle.

* * * * *